US 6,682,456 B2

(12) United States Patent
Allen et al.

(10) Patent No.: US 6,682,456 B2
(45) Date of Patent: Jan. 27, 2004

(54) MULTI-MESH GEAR SYSTEM

(75) Inventors: Mark Anderson Allen, Tucson, AZ (US); Mark T. Wyeth, Gibsonia, PA (US); Hanjoon Alex Kim, Menlo Park, CA (US)

(73) Assignee: Axicon Technologies, Inc., Pittsburgh, PA (US)

( * ) Notice: Subject to any disclaimer, the term of this patent is extended or adjusted under 35 U.S.C. 154(b) by 0 days.

(21) Appl. No.: 10/013,936

(22) Filed: Dec. 10, 2001

(65) Prior Publication Data

US 2003/0109355 A1 Jun. 12, 2003

(51) Int. Cl.$^7$ .............................................. F16H 57/08
(52) U.S. Cl. ....................................................... 475/344
(58) Field of Search ............................................ 477/344

(56) References Cited

U.S. PATENT DOCUMENTS

| | | |
|---|---|---|
| 1,194,904 A | 8/1916 | Wagner |
| 1,613,702 A | 1/1927 | Hammar |
| 1,690,931 A | 11/1928 | Hammar |
| 1,766,153 A | 6/1930 | Trbojevich |
| 2,453,656 A | 11/1948 | Bullard, III |
| 2,764,034 A | 9/1956 | Hotine |
| 3,184,988 A | 5/1965 | Osplack et al. |
| 3,206,997 A | 9/1965 | Hardy |
| 3,241,392 A | 3/1966 | Hardy |
| 3,881,364 A | 5/1975 | Rouverol |
| 3,881,365 A | 5/1975 | Hardy |
| RE28,696 E | 1/1976 | Rouverol |
| 3,937,098 A | 2/1976 | Rouverol |
| 3,938,865 A | 2/1976 | Rouverol |
| 3,946,621 A | 3/1976 | Rouverol |
| 3,982,444 A | 9/1976 | Rouverol |
| 3,982,445 A | 9/1976 | Rouverol |
| RE29,115 E | 1/1977 | Rouverol |
| 4,108,017 A | 8/1978 | Rouverol |
| 4,140,026 A | 2/1979 | Rouverol |
| 4,149,431 A | 4/1979 | Rouverol |
| 4,259,875 A | 4/1981 | Rouverol |
| 4,276,785 A | 7/1981 | Rouverol |

(List continued on next page.)

FOREIGN PATENT DOCUMENTS

| | | |
|---|---|---|
| FR | 521076 | 7/1921 |
| GB | 741376 | 11/1955 |

OTHER PUBLICATIONS

Product Brochure, Stealth® Planetary Gearhead, Bayside Precision Gearheads(no date).

Lin et al., "Profile Modification To Minimize Spur Gear Dynamic Loading", NASA Technical Memorandum 89901, Sep. 24, 1998.

(List continued on next page.)

*Primary Examiner*—Dirk Wright
(74) *Attorney, Agent, or Firm*—Reed Smith, LLP

(57) ABSTRACT

Disclosed herein is a multi-mesh gear system, such as an epicyclic gear system, in which (a) optimal performance is not load-specific and (b) the same profile modifications can be applied on both flanks of the common gear. This is accomplished through a novel combination of a constant system contact ratio and gearing having mesh stiffness variation reducing, or MSVR, modifications. An MSVR modification, such as Differential Crowning, will minimize the self-excited component of dynamic load for gear meshes across different operating loads, resulting in an optimized gearset. The specification of a substantially constant contact ratio for the multi-mesh gear system allows the same MSVR modification to be used on both tooth flanks of the common gear, reducing the cost and complexity of manufacture.

38 Claims, 3 Drawing Sheets

U.S. PATENT DOCUMENTS

| | | | |
|---|---|---|---|
| 4,324,441 A | 4/1982 | Rouverol |
| 4,446,752 A | 5/1984 | Shaffer et al. |
| 4,464,138 A | 8/1984 | Decker |
| 4,524,643 A | 6/1985 | Ziegler et al. |
| 4,589,300 A | 5/1986 | Rouverol |
| 4,644,814 A | 2/1987 | Rouverol |
| 4,651,588 A | 3/1987 | Rouverol |
| 4,899,609 A | 2/1990 | Nagata |
| 5,083,474 A | 1/1992 | Rouverol |
| 5,271,289 A | 12/1993 | Baxter, Jr. |
| 5,315,790 A | 5/1994 | Kish et al. |
| 5,341,699 A | 8/1994 | Rouverol |
| 5,373,336 A | 12/1994 | Sugita |
| 5,485,761 A | 1/1996 | Rouverol |
| 5,605,518 A | 2/1997 | Kogure et al. |
| 5,802,921 A | 9/1998 | Rouverol |
| 5,890,990 A | 4/1999 | Palau et al. |
| 5,946,975 A | 9/1999 | Yun |
| 6,230,578 B1 | 5/2001 | Kim et al. |

OTHER PUBLICATIONS

Rouverol et al., "The Reduction Of Gear Pair Transmission Error By Minimizing Mesh Stiffness Variation", American Gear Manufacturers Association, 88 FTM 11, Oct., 1998.

Rosen et al., "Design Of High Contact Ratio Gears", Am. Helicopter Society, 27M4, Oct., 1992.

Parker, R. et al., "Modeling, Modal Properties, And Mesh Stiffness Variation Instabilities Of Planetary Gears", NASA/CR–2001–210939, May 2001, pp. 1–119.

Lin et al., "Structured Vibration Characteristics of Planetary Gears with Unequally Spaced Planets",Journal of Sound and Vibration (2000).

Parker, "A Physical Explanation for the Effectiveness of Planet Phasing to Suppress Planetary Gear Vibration", Journal of Sound and Vibration (2000).

Gradu et al., "Planetary Gears with Improved Vibrational Behaviour in Automatic Transmissions", VDI Berichte NR1230, 1996.

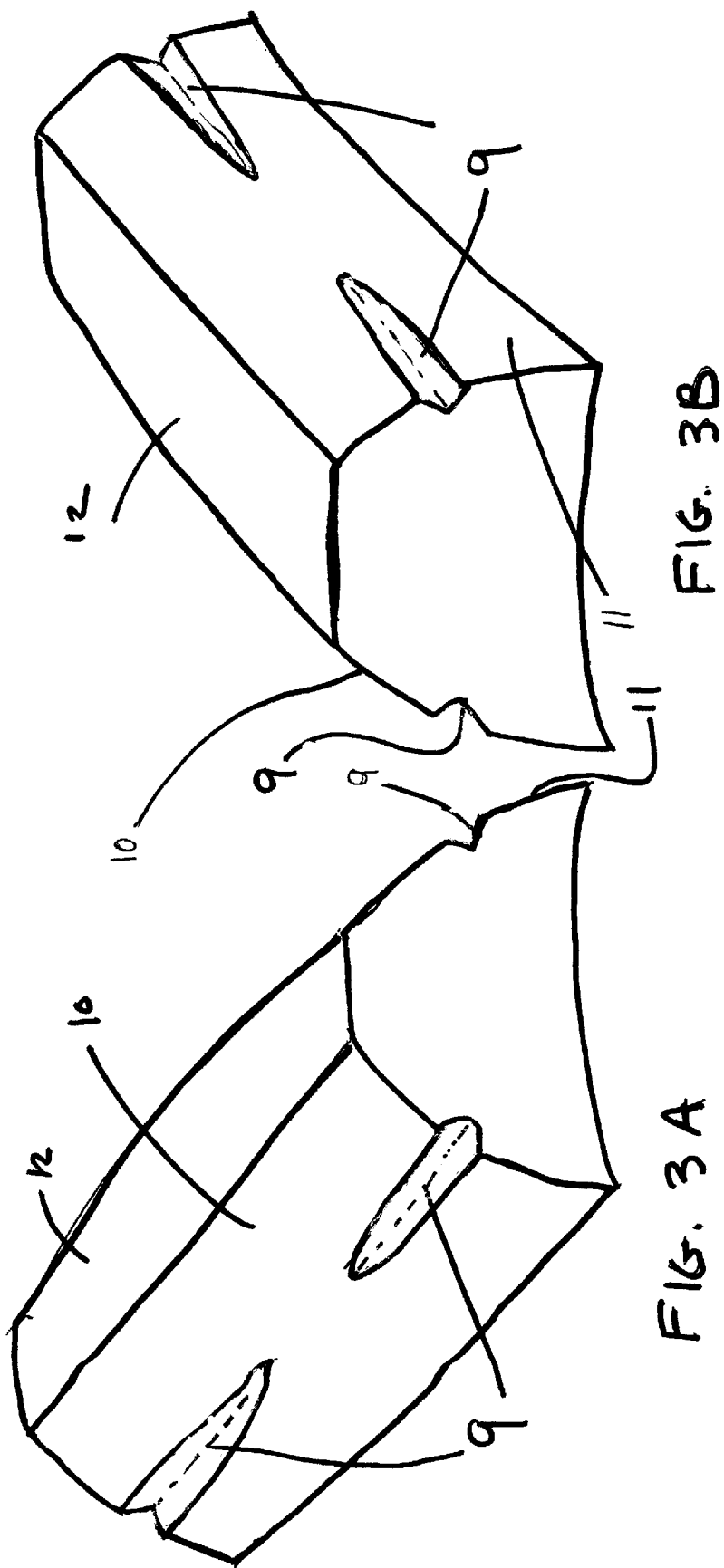

MULTI-MESH GEAR SYSTEM

I. BACKGROUND OF THE INVENTION

A. Field of the Invention

The invention disclosed herein relates generally to a multi-mesh gear system as well as to the design thereof. Generally, at least one presently preferred embodiment of the invention broadly relates to a multi-mesh gear system having design characteristics that reduce the self-excited component of dynamic load. It is also disclosed herein how to do so without significantly increasing the cost or complexity of manufacture. As a consequence of the reduced dynamic loading, the presently preferred multi-mesh gear systems disclosed herein generally have reduced noise and increased torque capacity or load-life performance when compared to conventional multi-mesh gear systems. Generally and broadly speaking, presently preferred gear systems and a presently preferred method of designing said gear systems that achieve desirable performance and cost characteristics are disclosed.

B. Description of the Prior Art

A multi-mesh gear system is characterized herein as a system having one or more gears, each of which is in mesh with two or more mating gears. Two gears are in mesh when the teeth of the two gears are in contact such that the gears will operate or turn together to turn other gears or other mechanisms such as drive shafts and similar machinery or components. Common examples of multi-mesh gear systems include epicyclic gear systems and idler gear systems. For the purposes of this disclosure, interchangeable stock gears can also be categorized as multi-mesh gear systems since the gears are intended to replace each other or other gears and mesh with many different mating gears.

An epicyclic gear system using spur gears will be used as the illustrative multi-mesh gear system for the purposes of this disclosure. However, this invention will apply equally to all multi-mesh gear systems and a variety of gear types. One skilled in the art will be able to extend the discussion herein to any multi-mesh gear system.

An epicyclic gear system is comprised of four elements: a sun gear, planet pinions, a planet carrier, and a ring gear. The sun gear meshes with at least one, but typically two or more planet pinions, also known as planet gears or planets. The planet pinions rotate about their own axes, revolve around the sun gear, and are mounted on a carrier, also known as the planet carrier. The planet pinions in turn also mesh with a ring gear, also known as an annulus gear. During rotation, a point on a planet pinion traces out epicyclic curves, hence the name.

As is characteristic of other multi-mesh gear systems, the planet pinions of an epicyclic gear system mesh with both the sun gear and the ring gear. Also, the planet pinion tooth flank in contact with the sun gear is opposite the planet pinion tooth flank in contact with the ring gear. The tooth flank is the portion of the planet pinion or any gear that comes in contact with another pinion or gear when the pinions or gears are in mesh. This is the characteristic that precludes full optimization of the complete multi-mesh system using conventional approaches for reducing noise and increasing torque capacity, as further detailed below.

It is well known in the art that as a pair of gears rotates, the effective stiffness of the gear mesh varies as a function of mesh cycle position. This periodic variation in mesh stiffness, referred to herein as mesh stiffness variation, gives rise to what has been referred to in the art as the dynamic increment of load. In addiction to serving as the primary excitation for gear noise, this dynamic increment serves to reduce the effective torque capacity of the gear mesh. A desirable design objective is to reduce the variation in mesh stiffness to the greatest degree possible. From a practical perspective, reducing mesh stiffness variation by a factor of two or more usually leads to an appropriate and desirable reduction in the dynamic increment of load, although any reduction in mesh stiffness variation will lead to a reduction in the dynamic increment of load that is desirable. Consequently, any means that can be employed to reduce this self-excited component of dynamic load will have the effect of reducing gear noise and increasing power density.

Conventional approaches to optimizing gear performance such as tip relief and root relief use initial separation to reduce mesh stiffness variation at one specific design load. At all other loads, the initial separation will be sub-optimal and in fact typically degrades performance. Further, the initial separation is optimized for the specific characteristics of one gear mesh between a first gear and a second gear and not for other meshes that exist between said first gear and other gears in the multi-mesh gear system. Thus, in multi-mesh gear systems, conventional approaches provide a solution that is optimized for only one load and only one mesh.

One approach for optimizing the performance of more than a single mesh in an epicyclic gear system is disclosed in U.S. Pat. No. 5,605,518 for a Planetary Gear Device wherein the tooth surfaces on one flank of the planet gears are optimized using tip and/or root relief for one mesh and the tooth surfaces on the other flank are optimized (also using tip and/or root relief) for the other mesh. This results in a multi-mesh system optimized for all meshes. There are, however, two major drawbacks to the disclosed solution. One, the manufacturing complexity and cost would significantly increase by requiring the manufacture of different profile modifications on the opposing tooth flanks of the planet gears. Two, the profile modifications specified in the referenced patent disclosure are limited to conventional modifications, such as tip and/or root relief, which utilize initial separation, and as a consequence, minimize mesh stiffness variation at one specific load only.

There is another means used in the industry aimed at reducing the mesh stiffness variation of epicyclic gear systems, known in the field as planet phasing. Several possible approaches to planet phasing are disclosed in U.S. Pat. No. 3,241,392 and further discussed in numerous published papers such as (a) J. Lin and R. G. Parker, "Structured Vibration Characteristics of Planetary Gears with Unequally Spaced Planets", *Journal of Sound and Vibration* (2000), (b) R. G. Parker, "A Physical Explanation for the Effectiveness of Planet Phasing to Suppress Planetary Gear Vibration", *Journal of Sound and Vibration* (2000), and (c) M. Gradu, K. Langenbeck, and B. Breunig, "Planetary Gears with Improved Vibrational Behaviour in Automatic Transmissions", VDI Berichte NR1230, 1996.

Planet phasing makes use of equal or unequal planet pinion spacing to control the relative phase separation of each planet pinion mesh. While the mesh stiffness variation of each mesh is unchanged through the use of planet phasing, the stiffness variation of the system can be manipulated in a way that reduces system vibration, albeit in a manner that can be load specific and quite sensitive to gear and assembly related manufacturing inaccuracies. Embodiments of this invention can be used in conjunction with any of the various planet phasing strategies.

In contrast with the above previously disclosed methods, it would be desirable to achieve a fully optimized multi-mesh gear system across substantially all relevant operating loads. It would also be desirable to do so without significantly increasing manufacturing complexity or cost. Additional desirable performance advantages of such a multi-mesh gear system include reduced noise and increased torque capacity or load-life performance.

II. SUMMARY OF THE INVENTION

In general, in one presently preferred embodiment broadly in accordance with the invention, a multi-mesh gear system is provided that is optimized to minimize the self-excited component of dynamic load across substantially all operating loads without a significant increase in manufacturing complexity or cost. This should have the effect of reducing noise and improving load-life performance. Generally, in one preferred embodiment broadly contemplated by the invention, a multi-mesh gear system that utilizes substantially the same contact ratio for all meshes within the multi-mesh gear system in combination with the use of a mesh stiffness variation reducing (MSVR) type of gear tooth modification is disclosed herein.

An MSVR modification is defined herein as any system or form of gear tooth modification that makes substantially equal the mesh stiffness in the region where fewer teeth are in contact and the mesh stiffness in the region where more teeth are in contact by modifying the elastic tooth pair stiffness characteristic. An example of an MSVR modification is Differential Crowning, a system of gear tooth modifications disclosed in U.S. Pat. Nos. 5,485,761, 5,341,699, and 5,083,474.

Differential Crowning, for the purposes of this disclosure, can be defined as the introduction of different forms and amounts of lead crowning at different positions along the height of the gear tooth to reduce the variation in mesh stiffness that occurs as the number of tooth pairs in contact changes during a mesh cycle. Differential Crowning is effective at substantially all loads because it changes the tooth stiffness elastically rather than by introducing an initial separation of the teeth.

Another example of an MSVR modification is Variable Face Width Gearing, which is disclosed in U.S. Pat. No. 6,230,578.

All MSVR modifications utilize a change in gear tooth geometries at specific locations along the tooth height to achieve the desired mesh stiffness characteristic. The location of these geometry changes is directly related to the contact ratio. If contact ratio changes, the proper location of these gear tooth geometry modifications will also change. As a result, the design of the MSVR modification is different for gearsets having different contact ratios.

As an example, combining Differential Crowning with the Planetary Gear Device disclosed in (U.S. Pat. No. 5,605,518 would lead to an optimized system from a performance standpoint. However, due to the use of substantially different contact ratios in the planet-to-sun and planet-to-ring meshes, it is necessary to apply different forms and amounts of Differential Crowning on opposing tooth flanks, which would result in a complex and costly manufacturing process.

Contact ratio is a number that indicates the average number of pairs of teeth in contact during a full mesh cycle for a given gear mesh. For spur gears, it is defined as the length of the line of contact divided by the base pitch. In conventional designs, contact ratio is not usually a critical design parameter; rather, it is more typically a byproduct of other design parameters.

As a result, in conventional design of an epicyclic gear system, again being used as a representative example of a multi-mesh gear system, the contact ratio of the planet-to-sun gear mesh is typically different from the contact ratio of the planet-to-ring gear mesh. To optimize this type of system at a particular load, any type of profile modification, such as tip relief,has to be different fot the planet-to-sun mesh than it is for the planet-to-ring mesh. This means that either the modifications on the opposing flanks of the planet gears have to be different, or separate modifications need to be made to both the sun gear and the ring gear. As a result, manufacturing becomes complex and costly, and still results in a system that has been optimized for only one operating load.

Generally, in one presently preferred embodiment broadly contemplated by the invention, disclosed herein is a multi-mesh gear system that combines the use of an MSVR modification to the gear teeth with the purposeful use of a constant contact ratio throughout said system. This combination of features allows the same modifications to be specified for both planet tooth flanks, and results in a system that can be optimized for substantially all operating loads, rather than in a way that is load-specific. Any deviation from using exactly the same contact ratio throughout said system would have the effect of changing the harmonic signature of the noise characteristic, usually increasing sound power present at higher harmonics of the tooth contact frequency. Depending on the specific application and the desired noise characteristic, it is preferred that all of the contact ratios be maintained within 1–3% of each other, although, as broadly contemplated by the invention, contact ratios that achieve desirable noise or performance characteristics outside of this range are also desirable.

These and other advantages of the present inventions will be clarified in the detailed description of the preferred embodiments taken together with the attached figures wherein like reference numerals represent like elements throughout.

III. BRIEF DESCRIPTION OF THE DRAWINGS

FIGS. 3A and 3B are perspective views of a planet tooth embodying the same Differential Crowning modifications on both flanks of the gear tooth in accord with the present inventions.

IV. DESCRIPTION OF THE PREFERRED EMBODIMENTS

Figure 1:
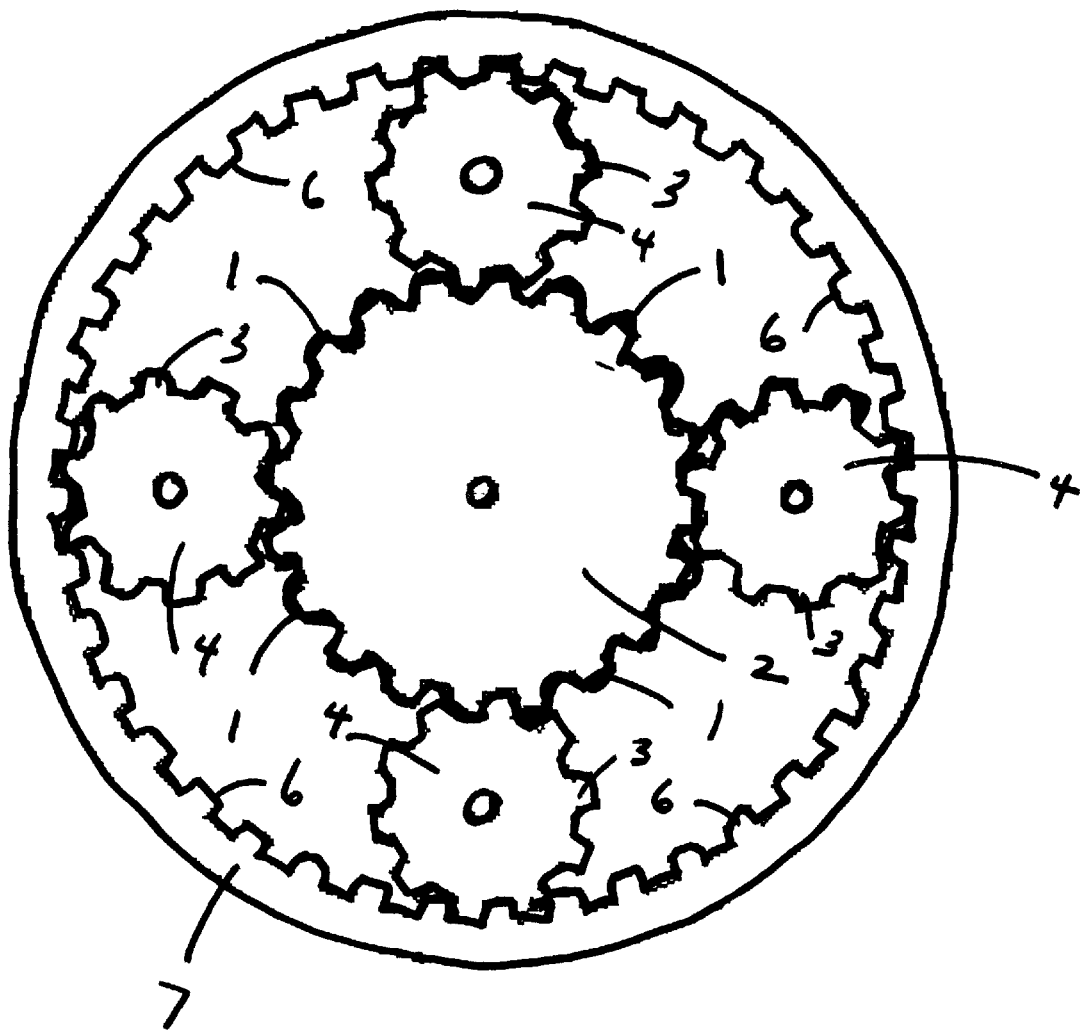
FIG. 1 is a section view of a typical planetary gear system.

It should be clear to those of ordinary skill in the art that the multi-mesh gear system embodying the disclosed inventions utilizes the standard parts of an epicyclic gear system and that standard gear action applies. As shown in FIG. 1, teeth 1 on sun gear 2 and teeth 3 on the planet pinion gears 4 are in mesh. Teeth 3 on the planet pinion gears 4 are in mesh with the teeth 6 on ring gear 7. The MSVR modifications discussed herein may be applied, although not shown on FIG. 1, to any one or all of the teeth 1,3,6 on any one or all of the gears 2,4,7 in accord with the principles of the invention.

Figure 2:
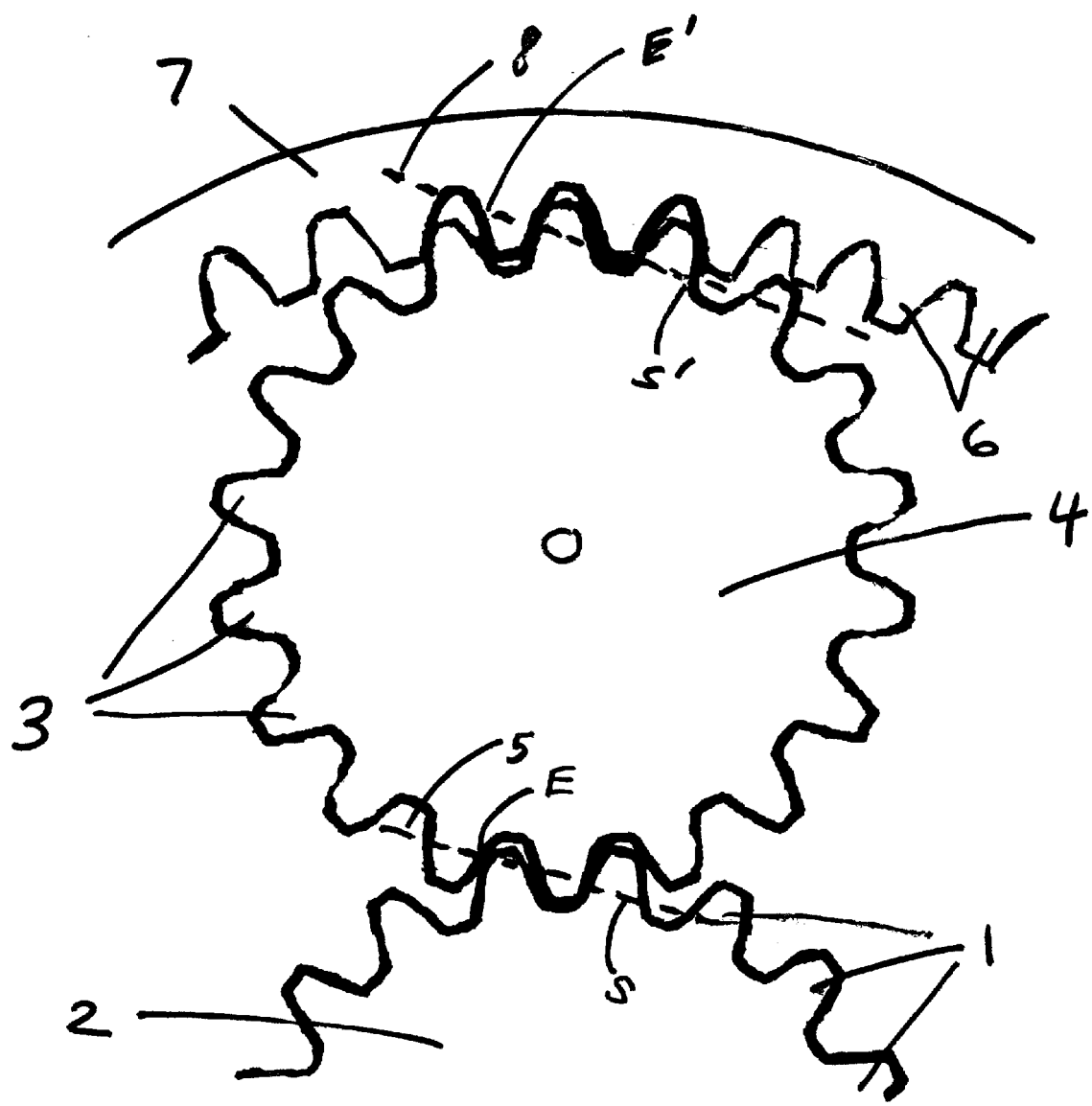
FIG. 2 is a partial section view of a typical planet gear meshing with both a sun gear and a ring gear.

As shown in FIG. 2, teeth 1 on sun gear 2 and teeth 3 on planet pinion gear 4 make contact along a pressure line 5 that contains the path of contact extending from Point S and ending at Point E. Teeth 3 on the planet pinion gear 4 also make contact with teeth 6 on ring gear 7 along a pressure line 8 that contains the path of contact extending from Point S' and ending at Point E'.

Note that as the gears rotate through a mesh cycle, the number of pairs of teeth in contact changes, which brings about a large variation in the effective mesh stiffness of conventional gearsets. Also, note that the transition of the change in number of tooth pairs in contact for the planet-to-sun mesh will not necessarily occur at the same point as that for the planet-to-ring mesh. Or using terminology known in the art, the contact ratio for the planet-to-sun mesh is not the same as that for the planet-to-ring mesh.

In one presently preferred embodiment, a substantially constant contact ratio is maintained for all gear meshes in the multi-mesh gear system, which then allows the same MSVR modification 9 to be applied to both flanks 10,11 of the teeth 12, as depicted in FIG. 3. Note that FIG. 3 depicts application of just one preferred of many possible MSVR modifications contemplated by the invention.

It is one presently preferred embodiment of the invention to apply the same modifications to both flanks of the planet gear, or in a non-epicyclic configuration to the common gear in a multi-mesh system, and as a consequence, to avoid the increase in complexity and cost associated with applying different modifications on each tooth flank. A feature that allows the same modification to be used on both flanks is the use of a substantially constant contact ratio for all meshes within the multi-mesh system.

It is another object of the current invention to minimize the variation in mesh stiffness across substantially all loads by applying an MSVR modification, which will have the effect of reducing gear noise and increasing power density. One preferred MSVR modification is Differential Crowning, although other forms may be used to achieve a similar result.

In another presently preferred embodiment of the invention broadly contemplated, the same or a substantially similar or compatible MSVR modification is applied to the two mating gears instead of to the common gear, typically the gear which is in contact with more than one other gear within the gearset. For an epicyclic system, the MSVR modification would be applied to the sun gear and the ring gear instead of the planet gears. In some instances, this can provide a cost advantage if the number of planet gears is much greater than two. A detailed production cost evaluation will determine the most cost-effective approach.

This invention can also be utilized for interchangeable stock gears. While not strictly a multi-mesh gear system, interchangeable stock gears are standardized gears that have been designed to mesh with many different mating gears. By establishing a family of gears, each member of which is designed to have substantially the same contact ratio, a stock gear can then be optimized over all relevant operating loads with MSVR modifications, and can then be used interchangeably with all other members of that family. This combines the advantage of having an inventory of interchangeable gears for repairs and replacements with the advantages associated with an MSVR modification.

This invention can be implemented in the design phase using the following preferred design methodology for designing an epicyclic gear system embodying the present invention. This methodology can be extended for the design of all other multi-mesh gear systems.

The initial step is to select the number of teeth for all gears, including the sun, planet, and ring gears, to achieve the desired overall reduction ratio.

Second, the number of planets is selected and the spacing between the planets is determined based on required load capacity and assembly considerations.

Third, a contact ratio is selected among those that can be achieved on both the sun/planet and planet/ring meshes, given the constraints of the tooth numbers that have been selected, the minimum topland thickness, and the minimum start of active profile on both meshes.

Fourth, the remaining dimensions of the sun, ring, and planet gears are calculated such that substantially the same contact ratio is maintained. The design variables that need to iterated in this step include, but are not limited to, the following: pressure angles, tooth addendums and dedendums, tooth thicknesses, backlash and root clearances.

Fifth and last, an MSVR modification is chosen for the sun/planet mesh that will reduce mesh stiffness variation over the relevant range of operating conditions. In many currently contemplated cases, this will entail using Differential Crowning, although other methods may be used depending on the desired performance-versus-cost characteristic of the application. Another presently preferred embodiment would be to place the modifications on the planet gear since this would typically result in a simpler and cheaper system. Then the same MSVR modification is analyzed for the planet/ring mesh for assurance. Iterations may be required in order to minimize the mesh stiffness variation while maintaining acceptable stress and contact pressure characteristics.

While for simplicity the above examples have shown presently preferred embodiments of the current invention as applied to parallel axis multi-mesh systems with spur gears, it is broadly contemplated by the invention that this concept can be implemented in non-parallel gear systems as well as with other gear forms such as helical and herringbone gears. And as stated above, this invention is applicable to all multi-mesh gear systems. Generally speaking, the same broadly contemplated general strategy of combining an MSVR modification with a substantially constant contact ratio for all meshes within the system can be used to achieve desired results and benefits.

If not otherwise stated herein, any and all patents, patent publications, articles and other printed publications discussed or mentioned herein are hereby incorporated by reference as if set forth in their entirety herein.

It should be appreciated that the apparatus and method of the present invention may be configured and conducted as appropriate for any context at hand. The embodiments described above are to be considered in all respects only as illustrative and not restrictive. Since many changes and variations of the disclosed embodiments of the inventions may become apparent to those skilled in the art and could be made without departing from the inventive concepts, it is not intended to limit the inventions to the disclosed embodiments but the inventions may be practiced within the full scope of the appended claims. The scope of the invention is defined by the following claims rather than the foregoing description. All changes which come within the meaning and range of equivalency of the claims are to be embraced within their scope.

What is claimed is:

1. A multi-mesh gear system comprising:
   at least three gears, wherein at least one of said gears is in mesh with at least two other of said gears, wherein:
   each of said gears comprises a plurality of teeth;
   the contact ratio is substantially equal for each gear mesh within said gear system; and
   at least one of said gears has a mesh stiffness variation reducing modification applied to said plurality of teeth.

2. The multi-mesh gear system of claim 1 wherein the contact ratio is equal for each gear mesh within said gear system.

3. The multi-mesh gear system of claim 1 wherein the mesh stiffness variation reducing modification comprises Differential Crowning.

4. The multi-mesh gear system of claim 1 wherein the mesh stiffness variation reducing modification comprises Variable Face Width Gearing.

5. The multi-mesh gear system of claim 1 wherein mesh stiffness variation is reduced over a plurality of operating loads.

6. The multi-mesh gear system of claim 1 wherein mesh stiffness variation is reduced over all operating loads.

7. The multi-mesh gear system of claim 1 wherein mesh stiffness variation is reduced by a factor of two over conventional multi-mesh gear systems.

8. The multi-mesh gear system of claim 1 wherein the contact ratio throughout said system does not vary more than 3 per cent.

9. The multi-mesh gear system of claim 1 wherein the contact ratio throughout said system does not vary more than 1 per cent.

10. The multi-mesh gear system of claim 1 wherein at least one of said gears has a mess stiffness variation reducing modification applied to all of its said teeth.

11. The multi-mesh gear system of claim 1 wherein a mess stiffness variation reducing modification is applied to said plurality of teeth for each of said gears.

12. An epicyclic gear system comprising:
    a sun gear, a ring gear and one or more planet pinion gears, wherein said one or more planet pinion gears are in mesh with both said sun gear and said ring gear, wherein;
    said sun gear, said ring gear and said one or more planet pinion gears comprise a plurality of teeth;
    the contact ratio is substantially the same for the mesh between said sun gear and at least one of said planet pinion gears and the mesh between at least one of said planet pinion gears and said ring gear within said system; and
    a mesh stiffness variation reducing modification is applied to said plurality of teeth on at least one of said sun gear, said ring gear or said planet pinion gears.

13. The epicyclic gear system of claim 12 wherein said contact ratio is the same for all gear meshes within said gear system.

14. The epicyclic gear system of claim 12 wherein each of said teeth of said planet pinion gears are comprised of two flanks and the same mesh stiffness variation reducing modification is applied to both flanks of each of said teeth of at least one of said planet pinion gears.

15. The epicyclic gear system of claim 12 wherein a mesh stiffness variation reducing modification is applied to said teeth of said ring gear and said sun gear.

16. The epicyclic gear system of claim 12 wherein mesh stiffness variation reducing modifications are applied to said teeth of said ring gear, said sun gear and said planet pinion gears.

17. The epicyclic gear system of claim 12 wherein the contact ratio of each gear mesh within said epicyclic gear system is no more than 3 per cent different than the contact ratio for other gear meshes within said epicyclic gear system.

18. The epicyclic gear system of claim 12 wherein the contact ratio of each gear mesh within said epicyclic gear system is no more than 1 per cent different than the contact ratio for other gear meshes within said epicyclic system.

19. The epicyclic gear system of claim 12 wherein said mesh stiffness variation reducing modification comprises Differential Crowning.

20. The epicyclic gear system of claim 12 wherein said mesh stiffness variation reducing modification comprises Variable Face Width Gearing.

21. A plurality of interchangeable gears wherein the contact ratio of the mesh between one of said interchangeable gears and any other of said interchangeable gears is substantially the same and at least one of said gears in mesh has a mesh stiffness variation reducing modification applied to its teeth.

22. The plurality of interchangeable gears of claim 21 wherein said plurality of interchangeable gears comprise stock gears.

23. The plurality of interchangeable gears of claim 21 wherein said contact ratio does not vary more than 3 per cent between meshes between said interchangeable gears.

24. The plurality of interchangeable gears of claim 21 wherein said mesh stiffness variation reducing modification comprises Differential Crowning.

25. The plurality of interchangeable gears of claim 21 wherein said mesh stiffness variation reducing modification comprises Variable Face Width Gearing.

26. A method for designing a gear system comprising at least three gears, wherein at least one of said gears is in mesh with at least two other of said gears, said method comprising:
    (a) determining the required operating conditions of said gear system and the desired stress and contact pressure characteristics of said gear system;
    (b) determining the configuration of the system and specifying the number of gears, the number of teeth for all of said gears, and the spacing of said gears within said system to achieve the required operating characteristics;
    (c) selecting a contact ratio such that it can be substantially achieved on all gear meshes within said gear system;
    (d) calculating and iterating the gear tooth dimensions for each of said gear meshes such that the contact ratio is maintained;
    (e) selecting a system of mesh stiffness variation reducing modifications such that the mesh stiffness variation is substantially reduced for each of said meshes over the range of operating loads of said gear system; and
    (e) iterating and modifying further said gears and said gear system as necessary to achieve said desired stress and contact pressure characteristics.

27. A method as in claim 26 wherein a contact ratio is chosen that can be maintained within 3 per cent on all gear meshes within said gear system.

28. A method as in claim 26 wherein a contact ratio is chosen that can be maintained within 1 per cent on all gear meshes within said gear system.

29. A method as in claim 26 wherein a system of mesh stiffness variation reducing modifications comprising Differential Crowning is selected.

30. A method as in claim 26 wherein a system of mesh stiffness variation reducing modifications comprising Variable Face Width Gearing is selected.

31. A multi-mesh gear system comprising:
    at least three gears, wherein at least one of said gears is in mesh with at least two other of said gears, wherein;
    each of said gears comprises a plurality of teeth;
    the contact ratio is substantially equal for each gear mesh within said system; and
    at least one of said gears has at least one of its said plurality of teeth modified such that the mesh stiffness does not substantially vary.

32. A multi-mesh gear system comprising:
at least three gears, wherein at least one of said gears is in mesh with at least two other of said gears, wherein;
each of said gears comprises a plurality of teeth;
the contact ratio is substantially equal for each gear mesh within said system; and
at least one of said gears has at least one of its said plurality of teeth modified such that the elastic tooth pair stiffness characteristic is modified.

33. A multi-mesh gear system comprising:
at least three gears, wherein at least one of said gears is in mesh with at least two other of said gears, wherein;
each of said gears comprises a plurality of teeth;
the contact ratio is substantially equal for each gear mesh within said system; and
at least one of said gears has at least one of its said teeth modified such that the elastic tooth pair stiffness characteristic is modified and the mesh stiffness does not substantially vary.

34. A multi-mesh gear system comprising:
at least three gears, wherein at least one of said gears is in mesh with at least two other of said gears, wherein the dynamic increment of load for each gear mesh within said gear system is reduced by making the contact ratio for each of said gear meshes substantially equal and by making mesh stiffness variation reduction modifications to at least one of said gears.

35. A multi-mesh gear system comprising:
at least three gears, wherein at least one of said gears is in mesh with at least two other of said gears, wherein:
each of said gears comprises a plurality of teeth;
the contact ratio is substantially equal for at least two gear meshes within said gear system; and
at least one of said gears has a mesh stiffness variation reducing modification applied to at least one of its said teeth such that noise from meshing of the gears is reduced due to a reduction of mesh stiffness variation.

36. A multi-mesh gear system comprising.
at least three gears, wherein at least one of said gears is in mesh with at least two other of said gears, wherein:
each of said gears comprises a plurality of teeth;
the contact ratio is substantially equal for at least two gear meshes within said gear system; and
at least one of said gears has a mesh stiffness variation reducing modification applied to at least one of its said teeth such that torque capacity of said gear system is increased.

37. A multi-mesh gear system comprising:
at least three gears, wherein at least one of said gears is in mesh with at least two other of said gears, wherein:
each of said gears comprises a plurality of teeth;
the contact ratio is substantially equal for at least two gear meshes within said gear system; and
at least one of said gears has a mesh stiffness variation reducing modification applied to at least one system is increased.

38. A multi-mesh gear system comprising:
at least three gears in which one gear is in mesh with at least two other gears;
wherein each of said gears has a plurality or teeth;
and in which noise due to the meshing of said gears has been reduced due to application of mess stiffness variation reduction modifications to at least one of said teeth of at least one of said gears and the contact ratios of at least two of gear meshes within said gear system are made to be substantially equal.

* * * * *